United States Patent
You et al.

(10) Patent No.: US 8,564,753 B2
(45) Date of Patent: Oct. 22, 2013

(54) DISPLAY SUBSTRATE HAVING PIXEL ELECTRODE WITH BRANCH ELECTRODE INCLUDING BENT PORTION, DISPLAY DEVICE HAVING THE SAME AND METHOD OF MANUFACTURING THE DISPLAY SUBSTRATE

(75) Inventors: Hye-Ran You, Incheon (KR); Su-Han Woo, Asan-si (KR); Su-Jeong Kim, Seoul (KR); Jae-Jin Lyu, Yongin-si (KR); Seung-Beom Park, Seoul (KR); Yoon-Sung Um, Yongin-si (KR)

(73) Assignee: Samsung Display Co., Ltd. (KR)

( * ) Notice: Subject to any disclaimer, the term of this patent is extended or adjusted under 35 U.S.C. 154(b) by 539 days.

(21) Appl. No.: 12/688,338

(22) Filed: Jan. 15, 2010

(65) Prior Publication Data

US 2010/0182557 A1 Jul. 22, 2010

(30) Foreign Application Priority Data

Jan. 21, 2009 (KR) ........................ 10-2009-0004849

(51) Int. Cl.
*G02F 1/1343* (2006.01)
(52) U.S. Cl.
USPC .......................................... 349/141; 349/129
(58) Field of Classification Search
USPC .................................................. 349/129, 141
See application file for complete search history.

(56) References Cited

U.S. PATENT DOCUMENTS

| 5,646,705 | A | 7/1997 | Higuchi et al. |
| 2002/0041354 | A1 | 4/2002 | Noh et al. |
| 2004/0160560 | A1* | 8/2004 | Kim et al. ...................... 349/129 |
| 2006/0146243 | A1* | 7/2006 | Nakanishi et al. ............ 349/139 |
| 2007/0153196 | A1* | 7/2007 | Jang et al. ...................... 349/141 |
| 2008/0084528 | A1* | 4/2008 | Lu et al. ......................... 349/126 |
| 2008/0297708 | A1 | 12/2008 | Yang et al. |
| 2009/0262287 | A1 | 10/2009 | Nishida |

FOREIGN PATENT DOCUMENTS

EP         2053451 A1    4/2009

OTHER PUBLICATIONS

European Search Report; EP 10 00 0513; Apr. 27, 2010.

* cited by examiner

*Primary Examiner* — Michael Caley
(74) *Attorney, Agent, or Firm* — Cantor Colburn LLP

(57) ABSTRACT

A display substrate includes a base substrate and a unitary indivisible pixel electrode. The base substrate includes a gate line, a data line crossing the gate line and a thin-film transistor electrically connected to the gate line and the data line formed thereon. A pixel area is defined on the base substrate. The unitary indivisible pixel electrode includes a plurality of branch electrodes formed on the pixel area and a connection electrode connecting the branch electrodes to each other. Each of the branch electrodes includes a bent portion and the bent portions of adjacent branch electrodes are spaced apart from each other.

18 Claims, 11 Drawing Sheets

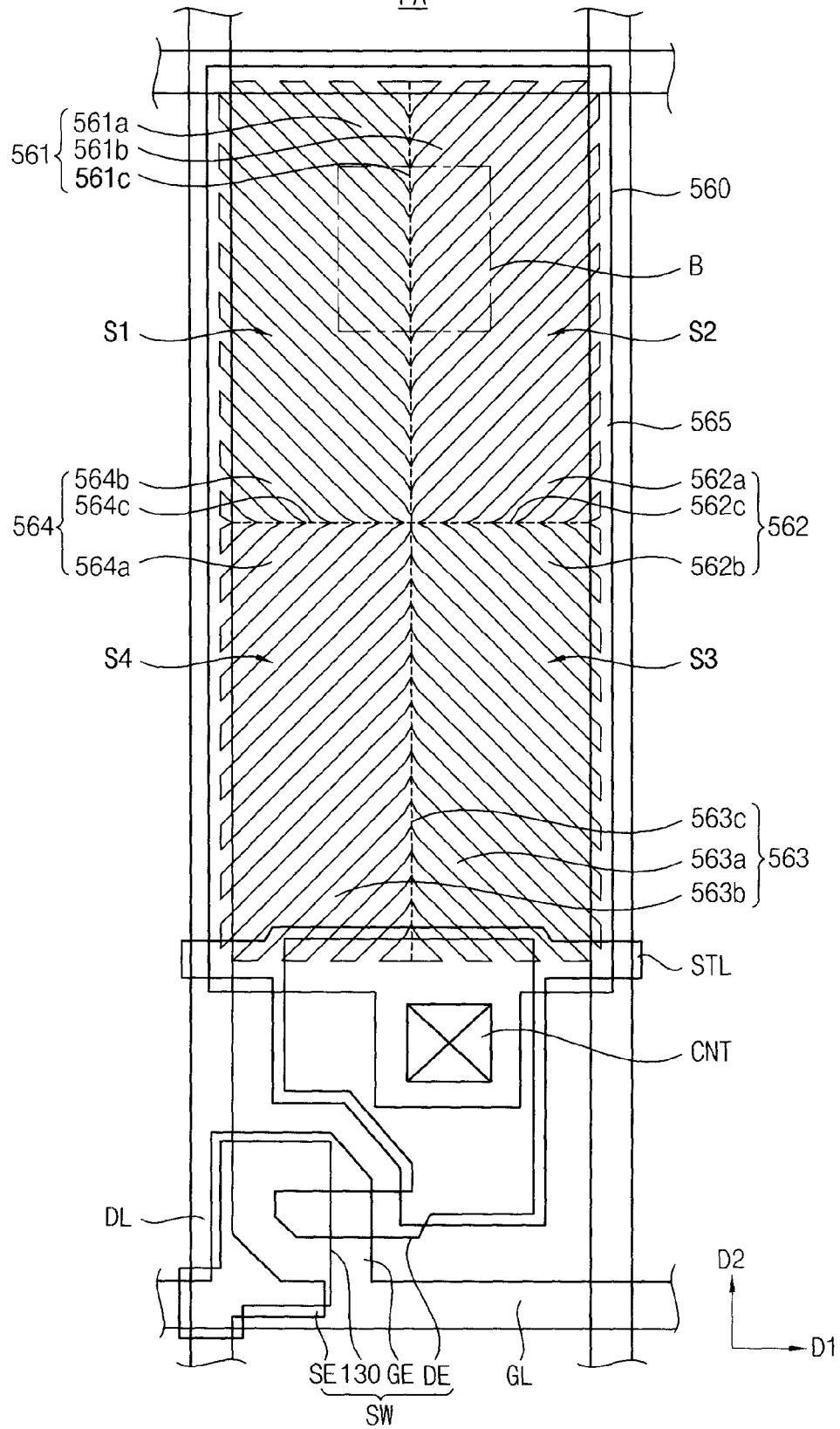

DISPLAY SUBSTRATE HAVING PIXEL ELECTRODE WITH BRANCH ELECTRODE INCLUDING BENT PORTION, DISPLAY DEVICE HAVING THE SAME AND METHOD OF MANUFACTURING THE DISPLAY SUBSTRATE

This application claims priority to Korean Patent Application No. 2009-0004849, filed on Jan. 21, 2009, and all the benefits accruing therefrom under 35 U.S.C. §119, the contents of which are herein incorporated by reference in their entirety.

BACKGROUND OF THE INVENTION

1. Field of the Invention

Exemplary embodiments of the present invention relate to a display substrate used in a liquid crystal display ("LCD") device, a display device including the display substrate, and a method of manufacturing the display substrate.

2. Description of the Related Art

A liquid crystal display ("LCD") device is one of the more widely used types of flat panel display devices. An LCD device includes a lower substrate including a plurality of pixel electrodes, an upper substrate including a common electrode facing the pixel electrodes, and a liquid crystal layer interposed there between.

Voltages different from each other are respectively applied to the pixel electrodes and the common electrode to generate an electric field between the pixel electrodes and the common electrode. The electric field is applied to the liquid crystal layer to control the arrangement of liquid crystal molecules in the liquid crystal layer, so that the LCD device displays images. A liquid crystal molecule has a long shape extended in a first direction. The liquid crystal molecule has a director parallel with the extended direction of the liquid crystal molecule. The amount of light transmitted through the liquid crystal layer is altered by an angle between the director of the liquid crystal molecules and incident light. Thus, the LCD device has a relatively narrow viewing angle with respect to other display devices.

To address the disadvantage of a narrow viewing angle, various techniques have been developed. For example, an LCD device of a patterned vertical alignment ("PVA") mode has been developed in which a pixel area is divided into a plurality of domains to be driven.

In the LCD device employing the PVA mode, the liquid crystal molecules are vertically aligned with respect to the upper and lower substrates, a uniform slit pattern or protrusion pattern is formed in the pixel electrode and/or the common electrode, so that a multi-domain structure is formed on a unit pixel area.

However, when a multi-domain structure is formed on the pixel area according to the slit pattern or protrusion pattern, the aperture ratio of a display device may be reduced. Moreover, the arrangement of liquid crystal molecules may not be controlled in parts, so that the visibility of the LCD device may be reduced.

BRIEF SUMMARY OF THE INVENTION

Exemplary embodiments of the present invention provide a display substrate capable of improving a viewing angle and the aperture ratio of a pixel area.

Exemplary embodiments of the present invention also provide a display device having the above-mentioned display substrate.

Exemplary embodiments of the present invention further also provide a method of manufacturing the above-mentioned display substrate.

An exemplary embodiment of a display substrate includes a base substrate and a unitary indivisible pixel electrode.

In an exemplary embodiment of the present invention, the base substrate may include a gate line, a data line crossing the gate line and a thin-film transistor ("TFT") electrically connected to the gate line and the data line disposed thereon. A pixel area may be defined on the base substrate. The unitary indivisible pixel electrode may include a plurality of branch electrodes disposed on the pixel area and a connection electrode connecting the branch electrodes to each other. Each of the branch electrodes may include a bent portion, and the bent portions of adjacent branch electrodes may be spaced apart from each other. The pixel electrode may be electrically connected to the TFT.

In an exemplary embodiment of the present invention, each of the branch electrodes may include a first pattern portion extended in an inclined direction with respect to the gate line when viewed in a plan view, a second pattern portion extended in an inclined direction with respect to the first pattern portion when viewed in the plan view, and a connection portion where a portion of the first pattern portion and a portion of the second pattern portion may meet each other to form the connection portion at the bent portion. When the pixel area includes a plurality of sub-areas adjacent to each other, the first pattern portion and the second pattern portion may be disposed on each of adjacent sub-areas, and the connection portion may be disposed along an outline of the sub-areas.

In an exemplary embodiment of the present invention, the connection portion may include a first sub-pattern portion being bent from the first pattern portion to be extended, and a second sub-pattern portion being bent from the second pattern portion to be extended and meeting the first sub-pattern portion to form the connection portion at the bent portion. An angle between the first sub-pattern portion and the second sub-pattern portion may be smaller than or equal to an angle between the first pattern portion and the second pattern portion when viewed in a plan view. The angle between the first pattern portion and the second pattern portion may be about 90° when viewed in a plan view, and the angle between the first sub-pattern portion and the second sub-pattern portion may be in a range from about 6° to about 90° when viewed in a plan view.

In an exemplary embodiment of the present invention, the connection portion may further include a planarization portion disposed in an inner area of the bent portion to increase the width of the bent portion. When each of the first pattern portion and the second pattern portion may have a first width, and a first pattern portion and a second pattern portion of the branch electrodes adjacent to each other are spaced apart from each other by a second width, the width of the bent portion comprising the planarization portion may be greater than the first width, and may be smaller than a total sum of the first width and the second width.

An exemplary embodiment of a display device includes a display substrate, an opposite substrate and a liquid crystal layer.

In an exemplary embodiment of the present invention, the display substrate may include a first base substrate and a unitary indivisible pixel electrode. The first base substrate may include a gate line, a data line crossing the gate line and a TFT electrically connected to the gate line and the data line disposed thereon. A pixel area may be defined on the first base substrate. The pixel electrode may be electrically connected to the TFT. The pixel electrode may include a plurality of branch electrodes disposed on the pixel area of the first base substrate and a connection electrode connecting the branch electrodes to each other. Each of the branch electrodes may include a bent portion, and the bent portions of adjacent branch electrodes are spaced apart from each other. The opposite substrate may include a second base substrate in which a common electrode is disposed to face the pixel electrode and a second base substrate facing the first base substrate. The liquid crystal layer may be disposed between the display substrate and the opposite substrate.

In an exemplary embodiment of a method of manufacturing a display substrate, a TFT is disposed on a substrate which includes a pixel area defined thereon. A passivation film and an organic layer may be sequentially deposited on the substrate which includes the TFT. A contact hole partially exposing the TFT may be disposed extended through the passivation film and the organic layer. A transparent conductive layer may be disposed on the organic layer including the contact hole extended therethrough. The transparent conductive layer may be patterned to form a unitary and indivisible pixel electrode. The pixel electrode may include a plurality of branch electrodes disposed on the pixel area and a connection electrode connecting the branch electrodes to each other. Each of the branch electrodes may include a bent portion, and the bent portions of adjacent branch electrodes are spaced apart from each other. The pixel electrode may be electrically connected to the TFT.

In exemplary embodiments of a display device including the display substrate and a method of manufacturing the display substrate, a unitary indivisible pixel electrode includes a plurality of branch electrodes which are spaced apart from each other and a connection electrode connecting the branch electrodes to each other, so that a pixel area may be divided into a plurality of domains, and conductive patterns connecting a center portion of the branch electrodes may be omitted. Advantageously, the viewing angle of a liquid crystal display device may be improved, and the aperture ratio of a pixel area may be improved.

BRIEF DESCRIPTION OF THE DRAWINGS

The above and other features and advantages of the present invention will become more apparent by describing in detailed exemplary embodiments thereof with reference to the accompanying drawings, in which:

FIG. 5 is a plan view illustrating another exemplary embodiment of a display device according to the present invention;

DETAILED DESCRIPTION OF THE INVENTION

Figure 1:
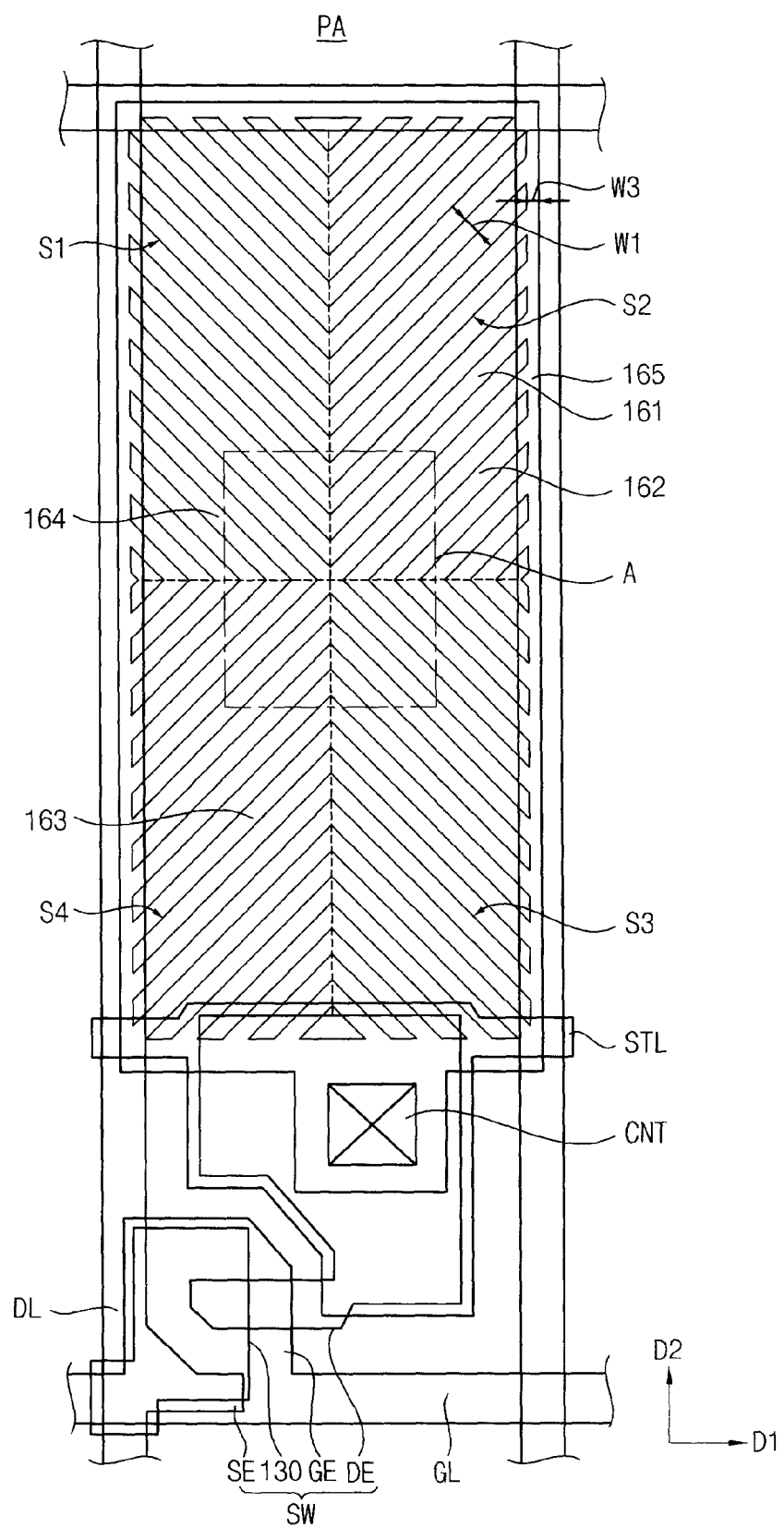
FIG. 1 is a plan view illustrating an exemplary embodiment of a display device according to the present invention.

The present invention is described more fully hereinafter with reference to the accompanying drawings, in which exemplary embodiments of the present invention are shown. The present invention may, however, be embodied in many different forms and should not be construed as limited to exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "coupled to" another element or layer, it can be directly on or connected to the other element or layer or intervening elements or layers may be present. In contrast, when an element is referred to as being "directly on" or "directly connected to" another element or layer, there are no intervening elements or layers present. As used herein, "connected" may refer to elements being physically and/or electrically connected to each other. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 2:
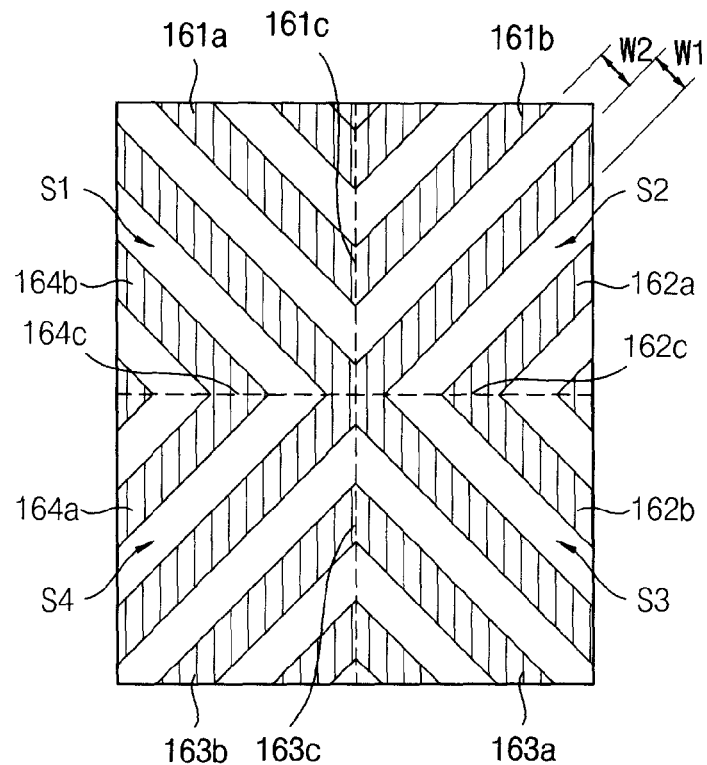
FIG. 2 is an enlarged plan view illustrating portion "A" of FIG. 1.
Figure 3:
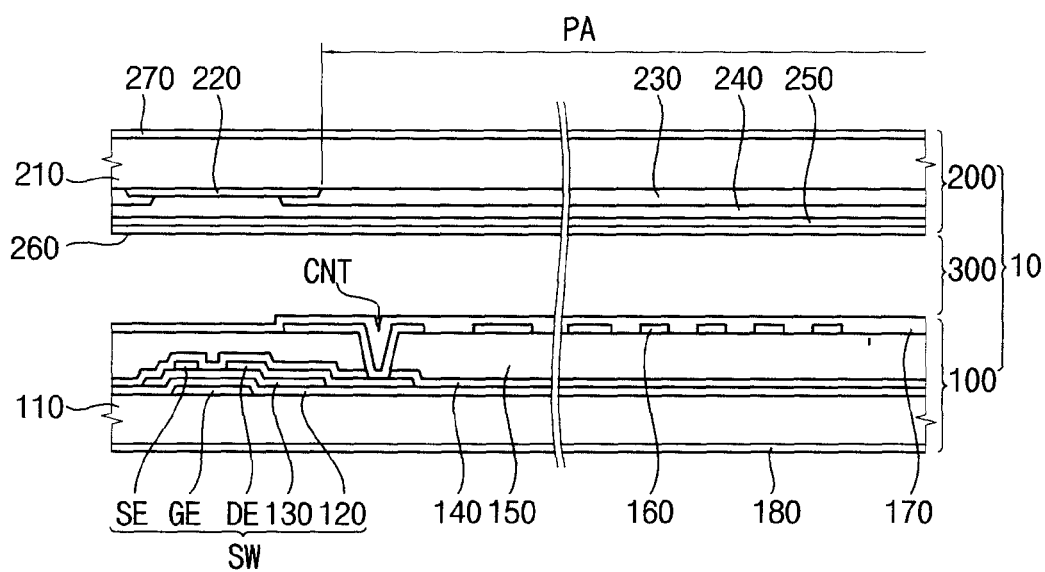
FIG. 3 is a cross-sectional view schematically illustrating an exemplary embodiment of the display device of FIG. 1.

FIG. 1 is a plan view illustrating an exemplary embodiment of a display device according to the present invention. FIG. 2 is an enlarged plan view showing portion "A" of FIG. 1. FIG. 3 is a cross-sectional view schematically illustrating a display device 10 of FIG. 1.

Referring to FIGS. 1 to 3, a display device 10 includes a display substrate 100, an opposite substrate 200 and a liquid crystal layer 300.

The display substrate 100 includes a first base substrate 110, a plurality of a gate line GL, a gate insulation layer 120, a plurality of a data line DL, a plurality of a thin-film transistor ("TFT") SW, a passivation film 140, an organic layer 150, a plurality of a pixel electrode 160 and a first alignment layer 170.

The first base substrate 110 includes a transparent insulating material capable of transmitting light. In one exemplary embodiment, the first base substrate 110 may include glass. The glass used for the first base substrate 110 may be an alkali-free glass. When the glass is an alkali glass, alkali ions are eluted from the glass to a liquid crystal cell, and thus display characteristics of the display device 10 may undesirably deteriorate. Due to the eluted alkali ions, an adhesiveness between a sealing member (not shown) sealing liquid crystals and the first base substrate 110 may be decreased. Accordingly, a driving of a TFT SW disposed on the first base substrate 110 may be damaged. Moreover, the first base substrate 110 may optically isotropic. A plurality of a pixel area PA is defined on the first base substrate 110.

In the plan view, the gate line GL is disposed between adjacent pixel areas PA of the first base substrate 110, and is longitudinally extended in a first direction D1 on the first base substrate 110. The gate line GL applies a gate signal applied from an external device (not shown) to the TFT SW to turn on the TFT SW. In one exemplary embodiment, the gate line GL may have a double-layer structure in which forming processes for each layer are different from each other. When the gate line GL includes the double-layer structure, a first layer of the gate line GL is formed using a metal having relatively strong mechanical and chemical characteristics such as chromium (Cr), molybdenum (Mo), molybdenum alloy, etc. and a second layer of the gate line GL is formed using a metal having a relatively low specific resistance such as aluminum (Al), aluminum alloy, etc.

The gate insulation layer 120 is disposed on the first base substrate 110 to cover the gate line GL and a plurality of a gate electrode GE. The gate insulation layer 120 may be disposed on an entire of the first base substrate 110 to overlap the plurality of the gate line GL and the plurality of the gate electrode GE. In an exemplary embodiment, the gate insulation layer 120 may include, but is not limited to, silicon nitride (SiNx), silicon oxide (SiNx etc.

In the plan view, the data line DL is disposed between adjacent pixel areas PA, and is longitudinally extended in a second direction D2 crossing the first direction D1 which is the extended direction of the gate line GL on the gate insulation layer 120. The second direction D2 may intersect the first direction such as to be substantially perpendicular to the first direction D1. The data line DL applies a data signal provided from an external device (not shown) to the pixel electrode 160 via the TFT SW.

The TFT SW includes the gate electrode GE electrically connected to the gate line GL, a semiconductor pattern 130 disposed directly on the gate insulation layer 120 corresponding to the gate electrode GE, a source electrode SE electrically connected to the data line DL, and a drain electrode DE electrically connected to the pixel electrode 160. As used herein, "corresponding" may refer to as being related in positional relationship, dimension and/or shape to another element, such as being aligned with the another element. The source electrode SE and the drain electrode DE are each disposed directly on the semiconductor pattern 130, and are spaced apart from each other in the plan view. The source electrode SE is disposed continuous with the data line DL, such that the source electrode SE and the data line DL are a unitary indivisible element of the display substrate 100. Similarly, the gate electrode GE is disposed continuous with the gate line GL, such that the gate electrode GE and the gate line GL are a unitary indivisible element of the display substrate 100.

When a gate signal from the gate line GL is applied to the gate electrode GE of the TFT SW, the semiconductor pattern 130 is altered from having nonconductive characteristics to having conductive characteristics. When the gate signal is applied to the gate electrode GE, the TFT SW is turned on. When the TFT SW is turned on, a data signal applied to the source electrode SE from the data line DL is applied to the pixel electrode 160 via the semiconductor pattern 130 and the drain electrode DE.

The passivation film 140 is disposed directly on the gate insulation layer 120 to cover the data line DL and the TFT SW. The passivation film 140 may be disposed on an entire of the first base substrate 110 to overlap the plurality of the data line DL and the plurality of the TFT SW. In one exemplary embodiment, the passivation film 140 may include silicon nitride (SiNx), silicon oxide (SiOx), etc., such as including the same material to the gate insulation layer 120.

The organic layer 150 is disposed directly on the passivation film 140 and effectively planarizes the display substrate 100. Moreover, the organic layer 150 may reduce a parasitic capacitance generated between the pixel electrode 160 and the data line DL. When the data line DL does not overlap with the pixel electrode 160, the organic layer 150 may be omitted. A contact hole CNT partially exposing a portion of the drain electrode DE is disposed extended completely both through the passivation film 140 and the organic layer 150.

In the plan view, the pixel electrode 160 is disposed directly on the organic layer 150 in correspondence with (e.g., aligned with) a pixel area PA of the first base substrate 110. The pixel electrode 160 may include an optically transparent and electrically conductive material. In one exemplary embodiment, the pixel electrode 160 may include indium tin oxide ("ITO"), indium zinc oxide ("IZO"), amorphous indium tin oxide ("a-ITO"), etc.

The pixel electrode 160 is electrically connected to the drain electrode DE of the TFT SW through the contact hole CNT disposed extending completely through both the passivation film 140 and the organic layer 150. A data signal applied to the data line DL is applied to the pixel electrode 160 through the source electrode SE and the drain electrode DE of the TFT SW. An electric field, which will be applied to a liquid crystal layer 300, is generated by the data signal applied to the pixel electrode 160, and a common voltage applied to a common electrode 250 of the opposite substrate 200.

The first alignment layer 170 is disposed directly on the organic layer 150 to cover the pixel electrode 160. The first alignment layer 170 may be disposed on an entire of the first base substrate 110 to overlap the plurality of the pixel electrode 160. The first alignment layer 170 may initially align liquid crystal molecules of the liquid crystal layer 300 to improve the response time of the liquid crystal molecules.

Referring again to FIG. 1, a storage line STL may be further disposed on the first base substrate 110. The storage line STL is disposed below the gate insulation layer 120, such as between the gate insulation layer 120 and the first base substrate 110, and is longitudinally extended substantially in parallel with the gate line GL. In the plan view, a portion of the storage line STL overlaps with a portion (e.g., an outer boundary) of the pixel electrode 160. A portion of the storage line STL also overlaps with a portion of the drain electrode DE of the TFT SW. A storage capacitor may be defined by the storage line STL, the pixel electrode 160, the gate insulation layer 120 and the passivation film 140. The storage capacitor may substantially uniformly maintain a voltage applied to the pixel electrode 160 for one frame.

Referring again to FIGS. 1 and 2, the pixel electrode 160 includes a plurality of branch electrodes 161, 162, 163 and 164, and a connection electrode 165. The connection electrode 165 is disposed at a periphery or boundary of the pixel electrode 160. First portions of the connection electrode 165 longitudinally extend in the first direction D1, and second portions of the connection electrode longitudinally extend in the second direction D2. The plurality of branch electrodes 161, 162, 163 and 164, and the connection electrode 165 are disposed continuous with each other, such that the plurality of branch electrodes 161, 162, 163 and 164, and the connection electrode 165 collectively form the pixel electrode 160 as a single, unitary and indivisible element of the display device.

The branch electrodes 161, 162, 163 and 164 are disposed on the pixel area PA to divide the pixel area PA into a plurality of domains S1, S2, S3 and S4.

Each of the branch electrodes 161, 162, 163 and 164 includes a bent portion. The bent portions of adjacent branch electrodes are spaced apart from each other in the plan view. Each of the branch electrodes 161, 162, 163 and 164 may have substantially a "V" shape in which a center portion thereof is bent. In the illustrated exemplary embodiment, each of branch electrodes 161, 162, 163 and 164 may include a plurality of first pattern portions 161a, 162a, 163a and 164a, a plurality of second pattern portions 161b, 162b, 163b and 164b, and a plurality of connection portions 161c, 162c, 163c and 164c, respectively.

Each of the first pattern portions 161a, 162a, 163a and 164a are longitudinally extended in a direction. The second pattern portions 161b, 162b, 163b and 164b are respectively each extended in an inclined direction with respect to the first pattern portion 161a, 162a, 163a and 164a, when viewed in the plan view. In one exemplary embodiment, the second pattern portions 161b, 162b, 163b and 164b may be extended in an inclined direction by an angle of about 90° with respect to the first pattern portions 161a, 162a, 163a and 164a when viewed in a plan view.

Each of the connection portions 161c, 162c, 163c and 164c are disposed at areas where portions (e.g., a first end) of the first pattern portions 161a, 162a, 163a and 164a meet portions (e.g., a first end) of the second pattern portions 161b, 162b, 163b and 164b, respectively. The areas where the first ends of the first pattern portions 161a, 162a, 163a and 164a meet the respective first ends of the second pattern portions 161b, 162b, 163b and 164b are indicated along the dotted lines in FIG. 2. The bent portion is formed at the connection portions 161c, 162c, 163c and 164c.

In one exemplary embodiment, each width of the first pattern portions 161a, 162a, 163a and 164a may be different from each width of the second pattern portions 161b, 162b, 163b and 164b, respectively. In an alternative exemplary embodiment, each width of the first pattern portions 161a, 162a, 163a and 164a may be substantially equal to each width of the second pattern portions 161b, 162b, 163b and 164b, respectively. Each of the widths of the pattern portions may be taken substantially perpendicular to the longitudinal (extension) direction of the pattern portions.

When the pixel area PA includes two sub-areas adjacent to each other, each of the first pattern portions 161a, 162a, 163a and 164a and the second pattern portions 161b, 162b, 163b and 164b is disposed on the adjacent sub-areas, respectively. The connection portions 161c, 162c, 163c and 164c are disposed along an outline (e.g., boundary) of the adjacent sub-areas.

In the illustrated exemplary embodiment, when the pixel area PA includes a first sub-area S1, a second sub-area S2 adjacent to the first sub-area S1 along an extended direction (first direction D1) of the gate line GL, a third sub-area S3 adjacent to the second sub-area S2 along an extended direction (second direction D2) of the data line DL, and a fourth sub-area S4 adjacent to the first sub-area S1 along an extended direction (second direction D2) of the data line DL and adjacent to the third sub-area S3 along an extended direction (first direction D1) of the gate line GL, the branch electrodes of the pixel electrode 160 may include a plurality of first branch electrodes 161, a plurality of second branch electrodes 162, a plurality of third branch electrodes 163 and a plurality of fourth branch electrodes 164. The first through fourth sub-areas S1 to S4 are separated in FIG. 1 by the crossed dotted line.

Referring to FIG. 1, a pair of branch electrodes of the pixel electrode 160 meets at a center of the pixel area PA, such as indicated at the intersection of the dotted lines indicating the first through fourth sub-areas S1 to S4. The pair of branch electrodes may include one branch electrode in the "V" shape and one branch electrode in an inverted "V" shape, disposed symmetrically about a (dotted) center line extended in the first direction D1. Such "V" and inverted "V" shaped branch electrodes may be considered as a first branch electrode 161 and a third branch electrode 163, respectively.

Alternatively, the pair of branch electrodes may include one branch electrode in a "<"shape (a "V" shape opened to the right), and one branch electrode in a ">" shape (a "V"shape opened to the left) disposed symmetrically about a (dotted) center line extended in the second direction D2. Such right-opened and a left-opened "V" shaped branch electrodes may be considered as a second branch electrode 162 and a fourth branch electrode 164, respectively.

Each of the first branch electrodes 161 includes a first pattern portion 161a disposed on the first sub-area S1, a second pattern portion 161b disposed on the second sub-area S2, and a connection portion 161c coinciding with portions of a boundary between the adjacent first sub-area S1 and the second sub-area S2 where the first pattern portion 161a and the second pattern portion 161b meet. The connection portions 161c of adjacent first branch electrodes 161 are spaced apart from each other by a predetermined distance. The first pattern portion 161a of the first branch electrodes 161 is inclined at an angle of about −45°with respect to the gate line GL, when viewed in a plan view. The second pattern portion 161b of the first branch electrodes 161 is inclined at an angle of about −135° with respect to the gate line GL, when viewed in a plan view.

Each of the second branch electrodes 162 includes a first pattern portion 162a disposed on the second sub-area S2, a second pattern portion 162b disposed on the third sub-area S3, and a connection portion 162c coinciding with portions of a boundary between the adjacent second sub-area S2 and the third sub-area S3 where the first pattern portion 162a and the second pattern portion 162b meet. The connection portions 162c of adjacent second branch electrodes 162 are spaced apart from each other by a predetermined distance. The first pattern portion 162a of the second branch electrodes 162 is inclined at an angle of about −135° with respect to the gate line GL when viewed in a plan view. The second pattern portion 162b of the second branch electrodes 162 is preferably inclined at an angle of about −45° with respect to the gate line GL. In one exemplary embodiment, the second branch electrodes 162 may have a shape in which the first branch electrodes 161 are rotated by an angle of about 90° in a clockwise direction.

Each of the third branch electrodes 163 includes a first pattern portion 163a disposed on the third sub-area S3, a second pattern portion 163b disposed on the fourth sub-area S4, and a connection portion 163c coinciding with portions of a boundary between the third sub-area S3 and the fourth sub-area S4. The connection portions 163c of adjacent third branch electrodes 163 are spaced apart from each other by a predetermined distance. The first pattern portion 163a of the third branch electrodes 163 is inclined at an angle of about 135° with respect to the gate line GL when viewed in a plan view. The second pattern portion 163b of the third branch electrodes 163 is inclined at an angle of about 45° with respect to the gate line GL when viewed in a plan view. In one exemplary embodiment, the third branch electrodes 163 may have a shape in which the first branch electrodes 161 are rotated by an angle of about 180° in a clockwise direction when viewed in a plan view.

Each of the fourth branch electrodes 164 includes a first pattern portion 164a disposed on the fourth sub-area S4, a second pattern portion 164b disposed on the first sub-area S1, and a connection portion 164c coinciding with portions of a boundary between the fourth sub-area S4 and the first sub-area S1. The connection portions 164c of adjacent fourth branch electrodes 164 are spaced apart from each other by a predetermined distance. The first pattern portion 164a of the fourth branch electrodes 164 is inclined at an angle of about 45° with respect to the gate line GL when viewed in a plan view. The second pattern portion 164b of the fourth branch electrodes 164 is inclined at an angle of about 135° with respect to the gate line GL when viewed in a plan view. In one exemplary embodiment, the fourth branch electrodes 164 may have a shape in which the first branch electrodes 161 are rotated by an angle of about 270° in a clockwise direction.

When the branch electrodes 161, 162, 163 and 164 are arranged as described above, pattern portions are disposed within the first and third sub-areas S1 and S3 to be extended in an inclined longitudinal direction by an angle of about 135° with respect to the gate line GL when viewed in a plan view. Since the pattern portions disposed on the second and fourth sub-areas S2 and S4 are extended in an inclined longitudinal direction by an angle of about 45° with respect to the gate line GL, a pixel area PA may be divided into a plurality of domains.

Respective edges of the first pattern portions 161a, 162a, 163a and 164a and the second pattern portions 161b, 162b, 163b and 164b meet at the bent portion of the branch electrodes 161, 162, 163 and 164 to form a "V" shape. Both inner edges at an inner side of the "V", and outer edges at an outer side of the "V" directly contact and meet each other. Each of the inner edges and the outer edges are completely linear extending from the connection electrode 165 to the respective connection portions 161c, 162c, 163c and 164c.

The connection electrode 165 connects to the branch electrodes 161, 162, 163 and 164, such that the connection electrode 165 is continuous and common to all of the branch electrodes 161, 162, 163 and 164. In the illustrated exemplary embodiment, the connection electrode 165 may connect terminals (e.g., distal ends) of the branch electrodes 161, 162, 163 and 164 to each other, such that the connection electrode 165 and the branch electrodes 161, 162, 163 and 164 collectively form a single, unitary and indivisible pixel electrode 160. Each of the branch electrodes 161, 162, 163 and 164 is spaced apart from each other by a predetermined distance. The connection electrode 165 electrically connects the branch electrodes 161, 162, 163 and 164 that are spaced apart from each other.

Referring to FIG. 1, a third width W3 of the connection electrode 165 may be greater than a first width W1 of the first pattern portions 161a, 162a, 163a and 164a or the second pattern portions 161b, 162b, 163b and 164b. Each of the widths W1 and W3 are taken in a direction substantially perpendicular to a longitudinal extension direction of the connection electrode 165, the first pattern portions 161a, 162a, 163a and 164a or the second pattern portions 161b, 162b, 163b and 164b, respectively.

The connection electrode 165 may be extended along an outline (e.g., boundary) of the pixel area PA. A shape in the plan view of the connection electrode 165 may be determined in accordance with a shape of the pixel area PA. In one exemplary embodiment, when the pixel area PA has a substantially rectangular shape, the connection electrode 165 may have a rectangular frame shape corresponding to the rectangular-shaped pixel area PA. The connection electrode 165 may be disposed completely within the pixel area PA such as to not overlap with the gate line GL and/or the data line DL. Alternatively, a portion of the connection electrode 165 may overlap with the data line DL and/or the gate line GL in the plan view.

The pixel electrode 160 may be electrically connected to the drain electrode DE of the TFT SW through the connection electrode 165. A portion of the connection electrode 165 is protruded to overlap with the drain electrode DE of the TFT SW in the plan view.

Referring again to FIG. 3, the opposite substrate 200 faces the display substrate 100.

The opposite substrate 200 may include a second base substrate 210, a light-blocking pattern 220, a color filter 230, an overcoating layer 240, the common electrode 250 and a second alignment layer 260.

The second base substrate 210 may include a transparent insulating material capable of transmitting light. In one exemplary embodiment, the second base substrate 210 may include a transparent glass. The glass may be an alkali-free glass to have optically isotropy.

The light-blocking pattern 220 is disposed on the second base substrate 210 corresponding to the gate line GL, the data line DL and the TFT SW. In one exemplary embodiment, the light-blocking pattern 220 may include an opaque inorganic material having photoresist components. The opaque inorganic material includes carbon black, a pigment mixture and a dye mixture. Alternatively, the light-blocking pattern 220 may include a metal material such as chromium (Cr), chromium oxide (CrOx), chromium nitride (CrNx), etc. When light transmitted through a light-blocking area is blocked by overlapping a color filter 230 which is described below, the light-blocking pattern 220 may be omitted. The pixel area PA may include areas of the display device, except for areas overlapping the light blocking pattern 220. The pixel area PA may include only areas not overlapping with the light blocking pattern 220.

The color filter 230 is disposed on the second base substrate 210 including the light-blocking pattern 220 which corresponds to the pixel electrode 160. The color filter 230 selectively transmits light having a predetermined wavelength. In one exemplary embodiment, the color filter 230 may include a red color filter transmitting a red light, a green color filter transmitting a green light, and a blue color filter transmitting a blue light.

The overcoating layer 240 is disposed on the second base substrate 210 which includes the light-blocking pattern 220 and the color filter layer 230 disposed thereon. The overcoating layer 240 protects the color filter 230 and planarizes a surface of the second base substrate 210 which includes the color filter 230 disposed thereon. The overcoating layer 240 may be disposed overlapping an entire of the second base substrate 210.

The common electrode 250 includes an optically transparent and/or electrically conductive material and is disposed directly on the overcoating layer 240. The common electrode 250 faces the pixel electrode 160 and is disposed overlapping an entire surface of the second base substrate 210. A common voltage Vcom is applied to the common electrode 250.

The second alignment layer 260 is disposed directly on the common electrode 250. The second alignment layer 260 and the first alignment layer 170 may initially align liquid crystal molecules of the liquid crystal layer 300.

The liquid crystal layer 300 is interposed between the display substrate 100 and the opposite substrate 200. In one exemplary embodiment, the liquid crystal molecules are sealed in a space defined by the display substrate 100, the opposite substrate 200 and a sealing member (not shown) disposed between the display substrate 100 and the opposite substrate 200, to form a liquid crystal layer 300.

The display device 10 may further include a lower polarizer 180 and an upper polarizer 270.

The lower polarizer 180 is attached below the first base substrate 110, such as to define a lowermost element or surface of the display device 10. The lower polarizer 180 has a first polarization axis to transmit light having a component in parallel with the first polarization axis of light applied from a backlight (not shown), and to reflect or absorb light having the remaining component. In one exemplary embodiment, the lower polarizer 180 polarizes light in the first polarization axis direction.

The upper polarizer 270 is attached on the second base substrate 210 to have a second polarization axis different from the first polarization axis, and to define an uppermost element or surface of the display device 10. The direction of the second polarization axis may be perpendicular to the first polarization axis direction. The upper polarizer 270 transmits light having a component in parallel with the second polarization axis of light transmitted through the liquid crystal layer 300 or applied from the exterior, and reflects or absorbs light having the remaining component.

The display device 10 according to the illustrated exemplary embodiment includes a pixel electrode 160 including branch electrodes 161, 162, 163 and 164 that are spaced apart from each other and the connection electrode 165 connecting the branch electrodes 161, 162, 163 and 164, so that a pixel area PA may be divided into a plurality of domains. In addition, conductive patterns connecting to a center portion of the branch electrodes may be omitted. Advantageously, the viewing angle of the display device 10 may be improved, and the aperture ratio of the pixel area PA may be increased.

FIGS. 4A to 4G are cross-sectional views schematically illustrating an exemplary embodiment of a process for manufacturing the display substrate of FIGS. 1 to 3.

Figure 4A:
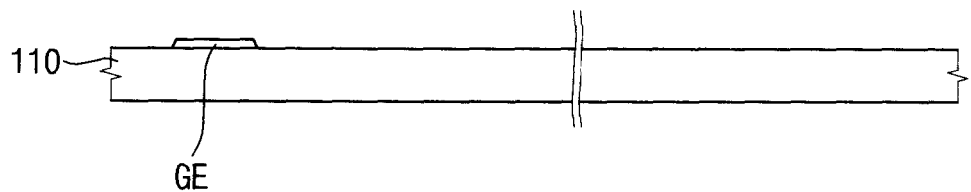
FIGS. 4A to 4G are cross-sectional views schematically illustrating an exemplary embodiment of a process for manufacturing a display substrate of FIGS. 1 to 3.

Referring to FIGS. 1, 2, 3 and 4A, a gate metal is deposited on the base substrate 110, such as through a sputtering process, to form a gate metal layer. In one exemplary embodiment, a double layer of aluminum (Al) and molybdenum (Mo) may be deposited to a thickness of about 3,000 angstroms (Å) to form a gate metal layer. The gate metal layer is patterned, such as through a photoetching process, to form the gate line GL and the gate electrode GE protruded from the gate line GL as shown in FIG. 4A. The gate line GL is extended in a first direction D1 on the first base substrate 110.

Referring to FIGS. 1, 2, 3 and 4B, a gate insulation layer 120 and a semiconductor pattern 130 are formed on the base substrate 110 which includes the gate line GL and the gate electrode GE. The gate insulation layer 120 is formed on the entire surface of the first base substrate 110 to cover (e.g., overlap) the gate line GL and a gate electrode GE. In one exemplary embodiment, silicon nitride (SiNx) or silicon oxide (SiOx) may be deposited to a thickness of about 4,500 Å to form the gate insulation layer 120. The semiconductor layer (not shown) is formed on the gate insulation layer 120. The semiconductor layer includes an amorphous silicon (a-Si) layer and an n+ amorphous silicon (n+ a-Si) layer that are sequentially formed on the gate insulation layer 120. The amorphous silicon (a-Si) layer may include amorphous silicon to have a thickness of about 2,000 Å.

Figure 4B:
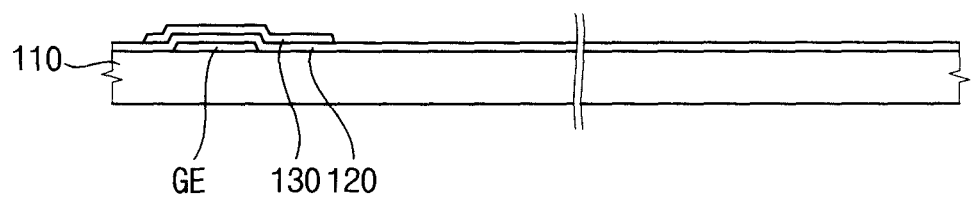

The n+ amorphous silicon (n+ s-Si) layer may include n+ amorphous silicon which is formed by implanting n+ impurities having a relatively high concentration to have a thickness of about 500 Å. In one exemplary embodiment, phosphorous (P) may be implanted into an upper portion of the semiconductor layer to form the n+ amorphous silicon (n+ s-Si) layer. The n+ amorphous silicon (n+ s-Si) layer may be partially removed so that the semiconductor layer is partially exposed. In one exemplary embodiment, the semiconductor layer is etched to form the semiconductor pattern 130 as shown in FIG. 4B. The semiconductor pattern 130 is formed on the gate electrode GE.

Referring to FIGS. 1, 2, 3 and 4C, a data metal layer is formed on the gate insulation layer 120. In one exemplary embodiment, a triple-layer structure of molybdenum-aluminum-molybdenum may be respectively deposited to a thickness of about 300 Å, about 2,500 Å and about 1,000 Å to form the data metal layer.

Figure 4C:
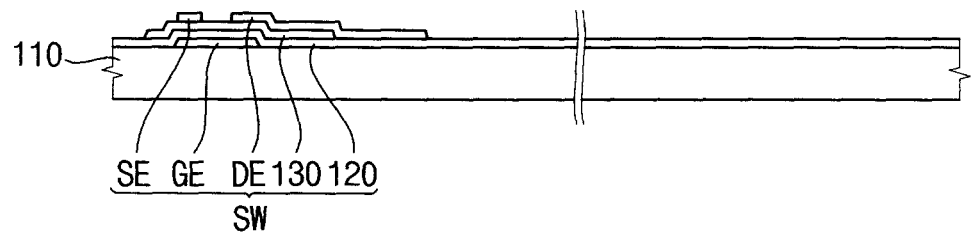
Figure 4D:
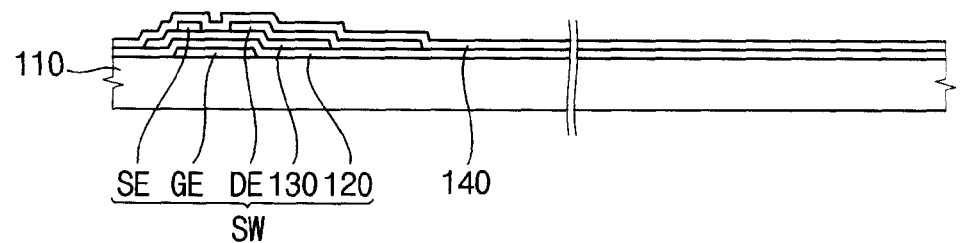
Figure 4E:
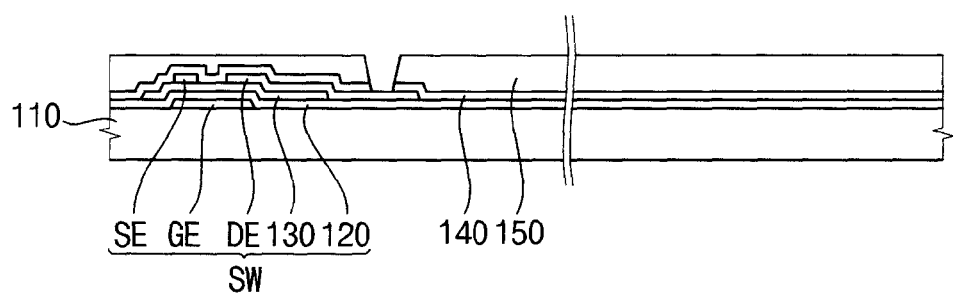
Figure 4F:
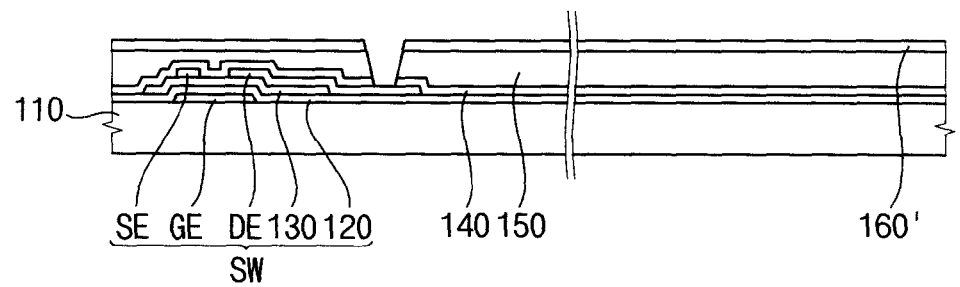

The data metal layer is patterned to form the data line DL, the source electrode SE and the drain electrode DE as shown in FIG. 4C. The data line DL is extended in a second direction D2 crossing the first direction D1 on the gate insulation layer 120. The source electrode SE is protruded from the data line DL toward an upper portion of the semiconductor pattern 130. The drain electrode DE is spaced apart from the source electrode SE, each disposed on the semiconductor pattern 130, in the plan view. A portion of the drain electrode DE is extended in the pixel area PA.

The gate electrode GE, the semiconductor pattern 130, the source electrode SE and the drain electrode DE define the TFT SW, which is a three-terminal element.

Referring FIGS. 1, 2, 3 and 4D, the passivation film 140 is formed on the base substrate 110 to cover the data line DL, the source electrode SE and the drain electrode DE. In one exemplary embodiment, silicon nitride (SiNx) or silicon oxide (SiOx) may be deposited on the base substrate 110 to a thickness of about 2,000 Å to form the passivation film 140.

Referring to FIGS. 1, 2, 3 and 4E, the organic layer 150 is formed on the passivation film 140. The organic layer 150 may be formed to have a thickness of about 2.0 micrometers (μm). The contact hole CNT exposing a portion of the drain electrode DE may be formed to extend completely through the organic layer 150 and the passivation film 140. When the pixel electrode 160 does not overlap with the data line DL, the organic 150 may be omitted.

Figure 4G:
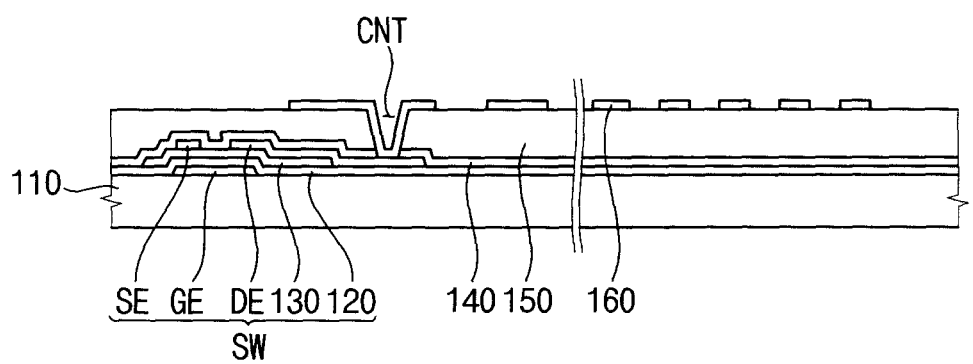

Referring to FIGS. 1, 2, 3 and 4F, a transparent conductive layer 160' is formed on the organic layer 150. In one exemplary embodiment, a transparent conductive material such as indium tin oxide ("ITO") or indium zinc oxide ("IZO") may be deposited to a thickness of about 900 Å to form the transparent conductive layer 160'. The transparent conductive layer 160' is patterned to form the pixel electrode 160, as illustrated in FIG. 4G. The pixel electrode 160 contacts the drain electrode DE through the contact hole CNT.

The pixel electrode 160 includes the branch electrodes 161, 162, 163 and 164 and the connection electrode 165. A detailed description of the pixel electrode 160 will be omitted.

Referring to FIGS. 1-3, the first alignment layer 170 is formed on the entire surface of the base substrate 110 which includes the pixel electrode 160 formed thereon. The first alignment layer 170 may initially align liquid crystal molecules of the liquid crystal layer 300.

Figure 6:
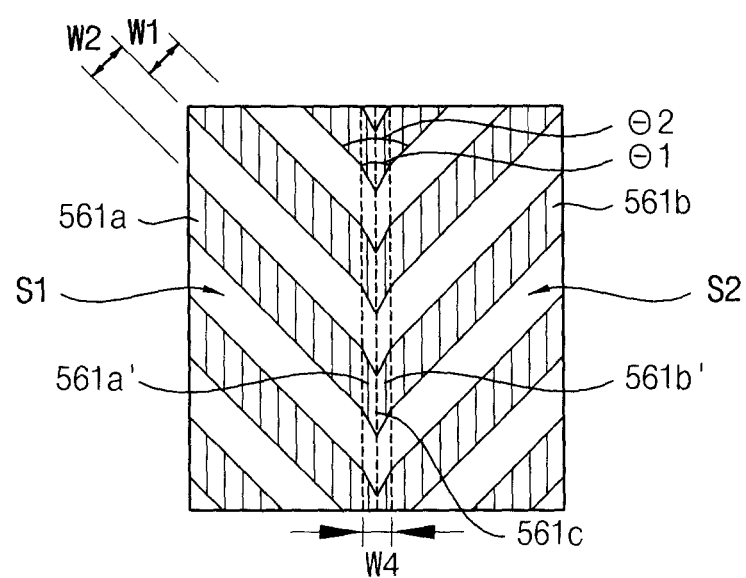
FIG. 6 is an enlarged plan view illustrating portion "B" of FIG. 5.

FIG. 5 is a plan view illustrating another exemplary embodiment of a display device according to the present invention. FIG. 6 is an enlarged plan view illustrating portion "B" of FIG. 5. The display device according to FIGS. 5 and 6 is substantially the same as the display device of FIGS. 1-3 except for a structure of a pixel electrode. Thus, identical reference numerals are used in FIGS. 5 and 6, and thus a detailed description thereof will be omitted.

Referring to FIGS. 5 and 6, the display device includes a display substrate 100, an opposite substrate 200 and a liquid crystal layer 300.

The display substrate 100 includes a first base substrate 110, a plurality of a gate line GL, a gate insulation layer 120, a plurality of a data line DL, a plurality of a TFT SW, a passivation film 140, an organic layer 150, a plurality of a pixel electrode 560 and a first alignment layer 170.

The pixel electrode 560 is disposed on the organic layer 150 in correspondence with a pixel area PA, and is electrically connected to a drain electrode DE of the TFT SW through a contact hole CNT disposed extended completely through the passivation film 140 and the organic layer 150.

The pixel electrode 560 includes a plurality of branch electrodes 561, 562, 563 and 564 and a connection electrode 565. The connection electrode 565 is disposed at a boundary of the pixel electrode 560. First portions of the connection electrode 565 longitudinally extend in the first direction D1, and second portions of the connection electrode longitudinally extend in the second direction D2. The plurality of branch electrodes 561, 562, 563 and 564, and the connection electrode 565 are disposed continuous with each other, such that the plurality of branch electrodes 561, 562, 563 and 564, and the connection electrode 565 collectively form the pixel electrode 560 as a single, unitary and indivisible element of the display device.

The branch electrodes 561, 562, 563 and 564 are disposed on the pixel area PA to divide the pixel area PA into a plurality of domains S1, S2, S3 and S4. Each of the branch electrodes 561, 562, 563 and 564 includes a bent portion. The bent portions of adjacent branch electrodes are spaced apart from each other in the plan view. Each of the branch electrodes 561, 562, 563 and 564 may have a substantially "V" shape in which a center portion thereof is bent. In the illustrated exemplary embodiment, each of branch electrodes 561, 562, 563 and 564 may include a plurality of first pattern portions 561a, 562a, 563a and 564a, a plurality of second pattern portions 561b, 562b, 563b and 564b, and a plurality of connection portions 561c, 562c, 563c and 564c, respectively.

Each of the first pattern portions 561a, 562a, 563a and 564a are extended in a direction. The second pattern portions 561b, 562b, 563b and 564b are respectively each extended in an inclined direction with respect to the first pattern portions 561a, 562a, 563a and 564a when viewed in a plan view. The second pattern portions 561b, 562b, 563b and 564b may be extended in an inclined direction by an angle of about 90° with respect to the first pattern portions 561a, 562a, 563a and 564a when viewed in a plan view.

The connection portions 561c, 562c, 563c and 564c are disposed at areas where portions (e.g., first ends) of the first pattern portions 561a, 562a, 563a and 564a meet portions (e.g., first ends) of the second pattern portions 561b, 562b, 563b and 564b, respectively. The bent portion is substantially disposed at the connection portions 561c, 562c, 563c and 564c. Edges of both the first pattern portions 561a, 562a, 563a and 564a and the second pattern portions 561b, 562b, 563b and 564b are not entirely linear extending from the connection electrode 565 to the bent portion. Portions of the edges adjacent to the bent portion (included in the connection portions 561c, 562c, 563c and 561d) are inclined at a different angle than a remainder of the edges extending from the connection electrode 565 to the connection portions 561c, 562c, 563c and 561d. The remainder of the edges do not directly contact or meet each other, as they are separated from each other by the edges of the connection portions 561c, 562c, 563c and 561d.

Referring to FIG. 6, a structure of the connection portion 561c of the first branch electrode 561 disposed in adjacent sub-pixel areas, will be described as representative of a configuration of the branch electrodes 561, 562, 563 and 564 of the pixel electrode 560. The connection portion 561c includes a first sub-pattern portion 561a' and a second sub-pattern portion 561b'. The first sub-pattern portion 561'a is bent (e.g., disposed inclined) from the first pattern portion 561a, and is extended continuously with the first pattern portion 561a. The second sub-pattern portion 561'b is bent (e.g., disposed inclined) from the second pattern portion 561b, and is extended continuously with the second pattern portion 561b. The second sub-pattern portion 561b' contacts and is disposed continuous with the first sub-pattern portion 561a' to form the bent portion of the first branch electrode 561.

A first angle θ1 between the first sub-pattern portion 561a' and the second sub-pattern portion 561b' may be smaller than or equal to a second angle θ2 between the first pattern portion 561a and the second pattern portion 561b. In one exemplary embodiment, when the second angle θ2 between the first pattern portion 561a and the second pattern portion 561b is about 90°, the first angle θ1 between the first sub-pattern portion 561a' and the second sub-pattern portion 561b' may be in a range from about 6° to about 90°.

When the pixel area PA includes two sub-areas S1 and S2 adjacent to each other, the first pattern portion 561a and the second pattern portion 561b are each disposed on the sub-areas S1 and S2, respectively, and the connection portion 561c is disposed along an outline (e.g., boundary) of the adjacent sub-areas S1 and S2.

When the first pattern portion 561a and/or the second pattern portion 561b have a first width W1 taken perpendicular to a longitudinal direction of the pattern portion, a fourth width W4 of the connection portion 561c taken perpendicular with respect to the boundary between the adjacent sub-areas S1 and S2, may be greater than the first width W1, and may be smaller than or equal to ten times the first width W1.

Referring again to FIG. 5, when the pixel area PA includes a first sub-area S1, a second sub-area S2 adjacent to the first sub-area S1 along an extended direction (first direction D1) of the gate line GL, a third sub-area S3 adjacent to the second sub-area S2 along an extended direction (second direction D2) of the data line DL, and a fourth sub-area S4 adjacent to the first sub-area S1 along an extended direction (second direction D2) of the data line DL and adjacent to the third sub-area S3 along an extended direction (first direction D1) of the gate line GL, the branch electrodes 561, 562, 563 and 564 of the pixel electrode 560 may include a plurality of first branch electrodes 561, a plurality of second branch electrodes 562, a plurality of third branch electrodes 563 and a plurality of fourth branch electrodes 564, similar to the pixel electrode 160 of the display device according to the exemplary embodiment illustrated in FIG. 1.

The first branch electrodes 561 include a first pattern portion 561a disposed on the first sub-area S1, a second pattern portion 561b disposed on the second sub-area S2, and a connection portion 561c disposed along portions of an outline (e.g, boundary) between the first sub-area S1 and the second sub-area S2. The connection portion 561c of adjacent first branch electrodes 561 are spaced apart from each other by a predetermined distance.

The second branch electrodes 562 include a first pattern portion 562a disposed on the second sub-area S2, a second pattern portion 562b disposed on the third sub-area S3, and a connection portion 562c disposed along portions of an outline (e.g., boundary) between the second sub-area S2 and the third sub-area S3. The connection portion 562c of adjacent second branch electrodes 562 are spaced apart from each other by a predetermined distance.

The third branch electrodes 563 include a first pattern portion 563a disposed on the third sub-area S3, a second pattern portion 563b disposed on the fourth sub-area S4, and a connection portion 563c disposed along an outline (e.g., boundary) between the third sub-area S3 and the fourth sub-area S4. The connection portion 563c of adjacent third branch electrodes 563 are spaced apart from each other by a predetermined distance.

The fourth branch electrodes 564 include a first pattern portion 564a disposed on the fourth sub-area S4, a second pattern portion 564b disposed on the first sub-area S1, and a connection portion 564c disposed along an outline (e.g., boundary) between the fourth sub-area S4 and the first sub-area S1. The connection portion 564c of adjacent fourth branch electrodes 564 are spaced apart from each other by a predetermined distance.

A method of manufacturing the display substrate of the exemplary embodiment in FIGS. 5 and 6 is substantially the same as the method of manufacturing the display substrate of the exemplary embodiment in FIG. 1, except for a structure of a pixel electrode. Thus, identical reference numerals will be used to refer to the same elements as those described, and thus a detailed description thereof will be omitted.

When a pixel area PA is divided into a plurality of domains by using a pixel electrode including a micro slit structure, an area in which liquid crystal is not controlled may be generated between adjacent domains. However, when the pixel electrode is configured in accordance with the illustrated exemplary embodiments, a pixel area PA may be divided into a plurality of domains, and an area where liquid crystal is not controlled may be advantageously minimized.

Figure 7:
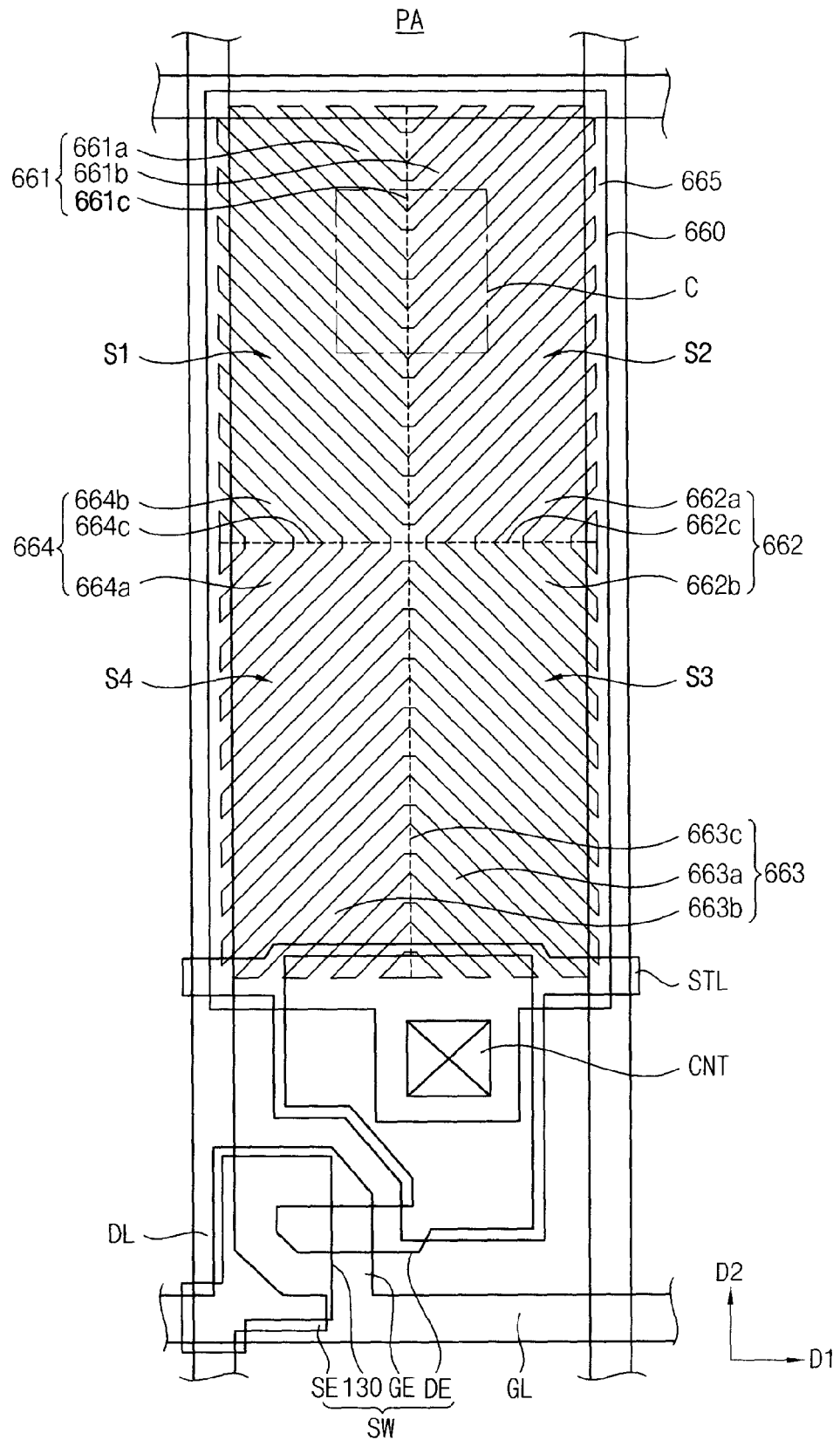
FIG. 7 is a plan view illustrating another exemplary embodiment of a display device according to the present invention.
Figure 8:
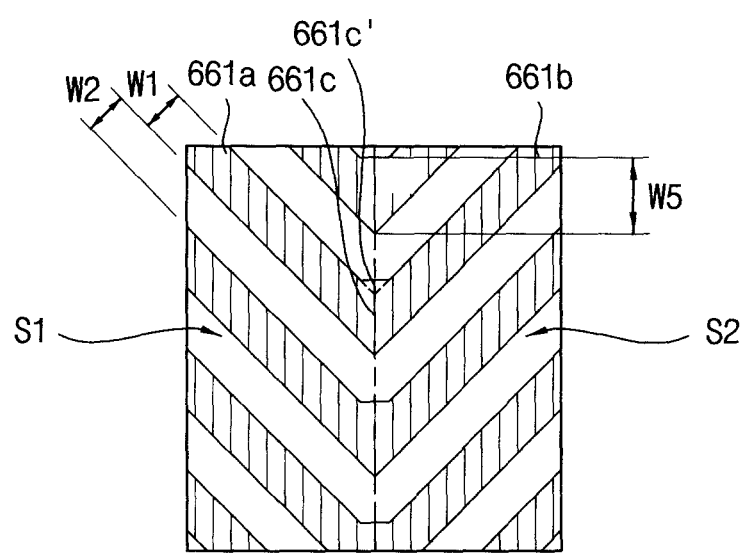
FIG. 8 is an enlarged plan view illustrating portion "C" of FIG. 7.

FIG. 7 is a plan view illustrating another exemplary embodiment of a display device according to the present invention. FIG. 8 is an enlarged plan view illustrating portion "C" of FIG. 7. The display device according to FIGS. 7 and 8 is substantially the same as the display device of FIGS. 1-3 except for a structure of a pixel electrode. Thus, identical reference numerals are used to refer to the same elements as those described, and thus a detailed description thereof will be omitted.

Referring to FIGS. 7 and 8, the display device 10 includes a display substrate 100, an opposite substrate 200 and a liquid crystal layer 300.

The display substrate 100 includes a first base substrate 110, a plurality of a gate line GL, a gate insulation layer 120, a plurality of a data line DL, a plurality of a TFT SW, a passivation film 140, an organic layer 150, a plurality of a pixel electrode 660 and a first alignment layer 170.

The pixel electrode 660 is disposed on the organic layer 150 in correspondence with the pixel area PA, and is electrically connected to the drain electrode DE of the TFT SW through the contact hole CNT disposed extended completely the passivation film 140 and the organic layer 150.

The pixel electrode 660 includes a plurality of branch electrodes 661 and a connection electrode 665. The connection electrode 665 is disposed at a boundary of the pixel electrode 660. First portions of the connection electrode 665 longitudinally extend in the first direction D1, and second portions of the connection electrode longitudinally extend in the second direction D2. The plurality of branch electrodes 661, 662, 663 and 664, and the connection electrode 665 are disposed continuous with each other, such that the plurality of branch electrodes 661, 662, 663 and 664, and the connection electrode 665 collectively form the pixel electrode 660 as a single, unitary and indivisible element of the display device.

The branch electrodes 661 are disposed on the pixel area PA to divide the pixel area PA into a plurality of domains. Each of the branch electrodes 661, 662, 663 and 664 includes a bent portion, and the bent portions of adjacent branch electrodes are spaced apart from each other in the plan view. Each of the branch electrodes 661, 662, 663 and 664 may have a substantially "V" shape in which a center portion thereof is bent. In the illustrated exemplary embodiment, each of branch electrodes 661, 662, 663 and 664 may include a plurality of first pattern portions 661a, 662a, 663a and 664a, a plurality of second pattern portions 661b, 662b, 663b and 664b, and a plurality of connection portions 661c, 662c, 663c and 664c, respectively.

Each of the connection portions 661c, 662c, 663c and 664c are disposed at areas where portions of the first pattern portions 661a, 662a, 663a and 664a meet portions of the second pattern portions 661b, 662b, 663b and 664b, respectively. The bent portion is substantially disposed at the connection portions 661c, 662c, 663c and 664c.

Referring to FIG. 8, a structure of the connection portion 661c of the first branch electrode 661, which is disposed in adjacent sub-pixel areas, will be described as representative of a configuration of the branch electrodes 661, 662, 663 and 664. A planarization portion 661c' is disposed at the connection portion 661c to increase the width of the bent portion. The planarization portion 661c' is disposed in an inner surface of the bent portion where the first pattern portion 661a and the second pattern portion 661b meet each other.

Outer edges of both the first pattern portions first pattern portions 661a, 662a, 663a and 664a and the second pattern portions 661b, 662b, 663b and 664b are entirely linear extending from the connection electrode 665 to the bent portion of the branch electrodes 661, 662, 663 and 664. Ends of the outer edges of the first pattern portions first pattern portions 661a, 662a, 663a and 664a and the second pattern portions 661b, 662b, 663b and 664b directly meet and contact each other to form a "V" shape.

Inner edges of both the first pattern portions first pattern portions 661a, 662a, 663a and 664a and the second pattern portions 661b, 662b, 663b and 664b are not entirely linear extending from the connection electrode 665 to the bent portion. Portions of the edges adjacent to the bent portion are inclined at a different angle than a remainder of the edges extending from the connection electrode 665 to the connection portions 661c, 662c, 663c and 661d. The portions of the inner edges adjacent to the bent portion are longitudinally extended substantially perpendicular to the connection portions 661c, 662c, 663c and 661d. The remainder of the edges do not directly contact or meet each other, as they are separated from each other by the planarization portions.

Each of the first pattern portion 661a and the second pattern portion 661b has a first width W1. When a first pattern portion 661a and a second pattern portion 661b of the first branch electrodes 661 adjacent to each other are spaced apart from each other by a second width W2, a fifth width W5 of the bent portion including the planarization portion 661c' is greater than the first width W1, and is smaller than a total sum W1+W2 of the first width W1 and the second width W2.

When the pixel area PA includes two sub-areas S1 and S2 adjacent to each other, the first pattern portion 661a and the second pattern portion 661b may each be disposed on the sub-areas S1 and S2, respectively. The planarization portion 661c' of the connection portion 661c may be disposed along an outline (e.g., boundary between the sub-areas S1 and S2).

In the illustrated exemplary embodiment, when the pixel area PA includes a first sub-area S1, a second sub-area S2 adjacent to the first sub-area S1 along an extended direction (first direction D1) of the gate line GL, a third sub-area S3 adjacent to the second sub-area S2 along an extended direction (second direction D2) of the data line DL, and a fourth sub-area S4 adjacent to the first sub-area S1 along an extended direction (second direction D2) of the data line DL and adjacent to the third sub-area S3 along an extended direction (first direction D1) of the gate line GL, the branch electrodes 661, 662, 663 and 664 may include a plurality of first branch electrodes 661, a plurality of second branch electrodes 662, plurality of third branch electrodes 663 and a plurality of fourth branch electrodes 664, similar to the pixel electrode 160 of the display device according to the exemplary embodiment illustrated in FIG. 1.

Each of the first branch electrodes 661 includes a first pattern portion 661a disposed on the first sub-area S1, a second pattern portion 661b disposed on the second sub-area S2, and a connection portion 661c disposed along portions of an outline (e.g., boundary) between the first sub-area S1 and the second sub-area S2. The connection portion 661c of adjacent first branch electrodes 661 are spaced apart from each other by a predetermined distance.

Each of the second branch electrodes 662 includes a first pattern portion 662a disposed on the second sub-area S2, a second pattern portion 662b disposed on the third sub-area S3, and a connection portion 662c disposed along portions of an outline (e.g., boundary) between the second sub-area S2 and the third sub-area S3. The connection portion 662c of adjacent second branch electrodes 662 are spaced apart from each other by a predetermined distance.

Each of the third branch electrodes 663 includes a first pattern portion 663a disposed on the third sub-area S3, a second pattern portion 663b disposed on the fourth sub-area S4, and a connection portion 663c disposed along portions of an outline (e.g., boundary) between the third sub-area S3 and the fourth sub-area S4. The connection portion 663c of adjacent third branch electrodes 663 are spaced apart from each other by a predetermined distance.

Each of the fourth branch electrodes 664 includes a first pattern portion 664a disposed on the fourth sub-area S4, a second pattern portion 664b disposed on the first sub-area S1, and a connection portion 664c disposed along portions of an outline (e.g., a boundary) the fourth sub-area S4 and the first sub-area S1. The connection portion 664c of adjacent fourth branch electrodes 664 are spaced apart from each other by a predetermined distance.

A method of manufacturing the display substrate according to the exemplary embodiment in FIGS. 7 and 8 is substantially the same as the method of manufacturing the display substrate of the exemplary embodiment in FIG. 1, except for a connection portion of the pixel electrode. Thus, identical reference numerals will be used to refer to the same elements as those described, and thus a detailed description thereof will be omitted.

When the pixel electrode is configured in accordance with the illustrated exemplary embodiments, a pixel area PA may be divided into a plurality of domains, and an area where liquid crystal is not controlled between adjacent domains may be advantageously minimized.

Figure 9:
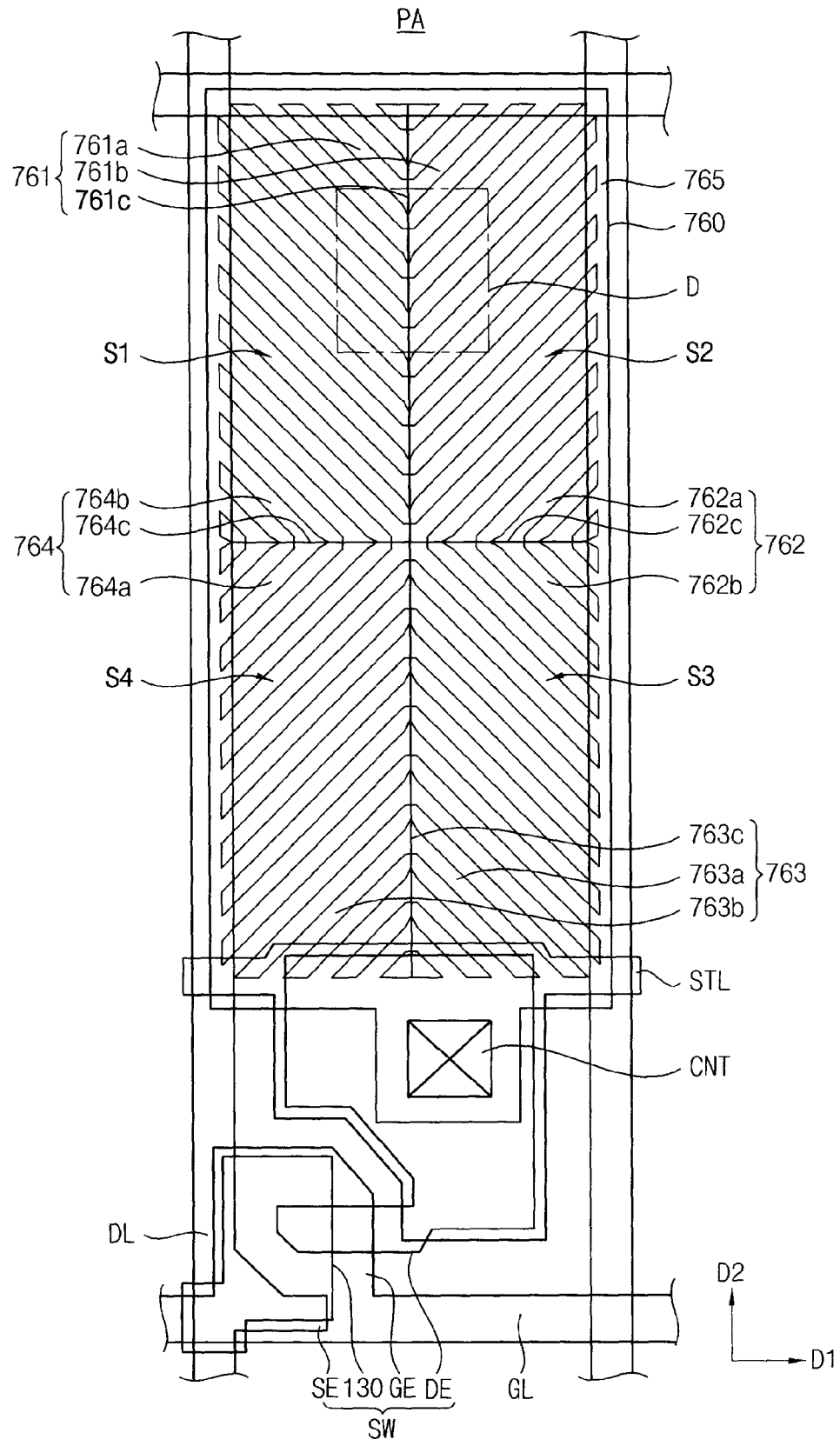
FIG. 9 is a plan view illustrating another exemplary embodiment of a display device according to the present invention.
Figure 10:
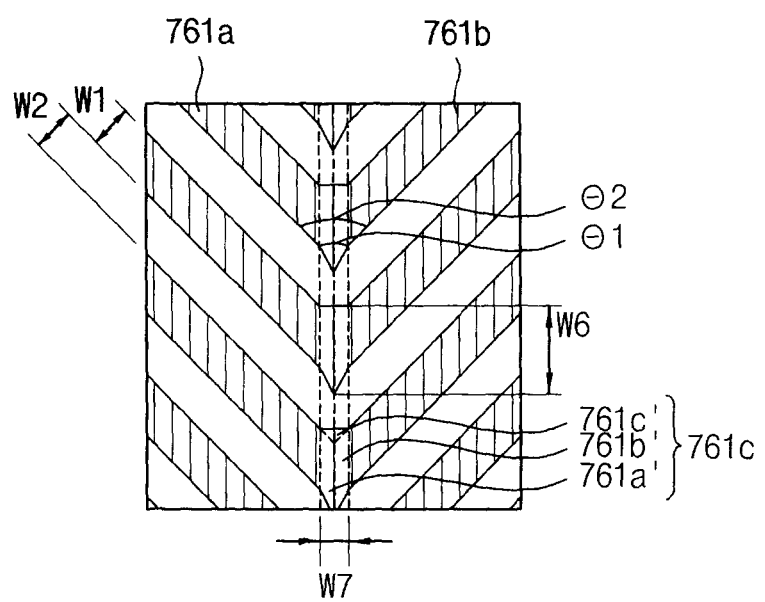
FIG. 10 is an enlarged plan view illustrating portion "D" of FIG. 9.

FIG. 9 is a plan view illustrating another exemplary embodiment of a display device according to the present invention. FIG. 10 is an enlarged plan view illustrating portion "D" of FIG. 9. The display device according to FIGS. 9 and 10 is substantially the same as the display device of FIGS. 1-3 except for a structure of a pixel electrode. Thus, identical reference numerals are used to refer to the same elements as those described, and thus a detailed description thereof will be omitted.

Referring to FIGS. 9 and 10, the display device includes a display substrate 100, an opposite substrate 300 and a liquid crystal layer 300.

The display substrate 100 includes a first base substrate 110, a plurality of a gate line GL, a gate insulation layer 120, a plurality of a data line DL, a plurality of a TFT SW, a passivation film 140, an organic layer 150, a plurality of a pixel electrode 760 and a first alignment layer 170.

The pixel electrode 760 is disposed on the organic layer 150 corresponding to the pixel area PA, and is electrically connected to the drain electrode DE of the TFT SW through the contact hole CNT disposed extended completely through the passivation film 140 and the organic layer 150.

The pixel electrode 760 includes a plurality of branch electrodes 761, 762, 763 and 764 and a connection electrode 765. The connection electrode 765 is disposed at a boundary of the pixel electrode 760. First portions of the connection electrode 765 longitudinally extend in the first direction D1, and second portions of the connection electrode longitudinally extend in the second direction D2. The plurality of branch electrodes 761, 762, 763 and 764, and the connection electrode 765 are disposed continuous with each other, such that the plurality of branch electrodes 761, 762, 763 and 764, and the connection electrode 765 collectively form the pixel electrode 760 as a single, unitary and indivisible element of the display device.

The branch electrodes 761, 762, 763 and 764 are disposed on the pixel area PA to divide the pixel area PA into a plurality of domains. Each of the branch electrodes 761, 762, 763 and 764 includes a bent portion, and the bent portions of adjacent branch electrodes are spaced apart from each other in the plan view. Each of the branch electrodes 761, 762, 763 and 764 may have a substantially "V" shape in which a center portion thereof is bent. In the illustrated exemplary embodiment, each of branch electrodes 761, 762, 763 and 764 may include a plurality of first pattern portions 761a, 762a, 763a and 764a, a plurality of second pattern portions 761b, 762b, 763b and 764b, and a plurality of connection portions 761c, 762c, 763c and 764c, respectively.

The first pattern portions 761a, 762a, 763a and 764a are each longitudinally extended in a direction. The second pattern portions 761b, 762b, 763b and 764b are respectively extended in an inclined direction with respect to the first pattern portion 761a, 762a, 763a and 764a when viewed in a plan view. The second pattern portions 761b, 762b, 763b and 764b may be extended in an inclined direction by an angle of about 90° with respect to the first pattern portions 761a, 762a, 763a and 764a when viewed in a plan view.

The connection portion 761c, 762c, 763c and 764c are areas where portions of the first pattern portions 761a, 762a, 763a and 764a meet portions of the second pattern portions 761b, 762b, 763b and 764b, respectively. The bent portion is formed at the connection portions 761c, 762c, 763c and 764c. Edges of both the first pattern portions 761a, 762a, 763a and 764a and the second pattern portions 761b, 762b, 763b and 764b are not entirely linear extending from the connection electrode 765 to the bent portion. Portions of the edges adjacent to the bent portion (included in the connection portions 761c, 762c, 763c and 761d) are inclined at a different angle than a remainder of the edges extending from the connection electrode 765 to the connection portions 761c, 762c, 763c and 761d. The remainder of the edges do not directly contact or meet each other, as they are separated from each other by the edges of the connection portions 761c, 762c, 763c and 761d.

The connection portion 761c of the first branch electrode 761, which is disposed on adjacent sub-pixel areas, will be described as representative of a configuration of the branch electrodes 761, 762, 763 and 764. The connection portion 761c includes a first sub-pattern portion 761a', a second sub-pattern portion 761b', and a planarization portion 761c'. The first sub-pattern portion 761a' is bent (e.g., disposed inclined) from the first pattern portion 761a and is extended continuously therewith. The second sub-pattern portion 761'b is bent (e.g., disposed inclined) from the second pattern portion 761b and is extended continuous therewith, and directly contacts the first sub-pattern portion 761a' to form the bent portion. The planarization portion 761c' increases the width of the bent portion, and is disposed between outer edges of the first pattern portion 761a and the second pattern portion 762b.

A first angle θ1 between the first sub-pattern portion 761a' and the second sub-pattern portion 761b' may be smaller than or equal to a second angle θ2 between the first pattern portion 761a and the second pattern portion 761b. In one exemplary embodiment, when the second angle θ2 between the first pattern portion 761a and the second pattern portion 761b is about 90°, the first angle θ1 between the first sub-pattern portion 761a' and the second sub-pattern portion 761b' may be in a range from about 6° to about 90°.

The planarization portion 761c' is disposed in a bent portion connecting the first sub-pattern portion 761a' with the second sub-pattern portion 761b'. The first pattern portion and the second pattern portion have a first width W1. When the first pattern portion and the second pattern portion of branch electrodes 761 adjacent to each other are spaced apart from each other as a second width W2, a sixth width W6 of the bent portion including the planarization portion 761c', the first sub-pattern portion 761a' and the second sub-pattern portion 761b' may be greater than a total sum of the first width W1 and the second width W2. Alternatively, the sixth width W6 of the bent portion including the planarization portion 761c', the first sub-pattern portion 761a' and the second sub-pattern portion 761b' may be smaller than a total sum of the first width W1 and the second width W2.

When the pixel area PA includes two sub-areas S1 and S2 adjacent to each other, the first pattern portion 761a and the second pattern portion 761b of the branch electrode 761 are each disposed on the sub-areas S1 and S2 respectively, the planarization portion 761c' of the connection portion 761c is disposed along an outline (e.g., boundary) between the sub-areas S1 and S2, and the first sub-pattern portion 761a' and the second sub-pattern portion 761b' are extended continuously with the first pattern portion 761a and the second pattern portion 761b. The first pattern portion 761a and/or the second pattern portion 761b include a first width W1. A seventh width W7 of the connection portion 761c taken perpendicular with respect to the boundary between the sub-areas S1 and S2, may be greater than the first width W1, and may be smaller than or equal to about ten times the first width W1.

Referring again to FIG. 9, when the pixel area PA includes a first sub-area S1, a second sub-area S2 adjacent to the first sub-area S1 along an extended direction (first direction D1) of the gate line GL, a third sub-area S3 adjacent to the second sub-area S2 along an extended direction (second direction D2) of the data line DL, and a fourth sub-area S4 adjacent to the first sub-area S1 along an extended direction (second direction) of the data line DL and adjacent to the third sub-area S3 along an extended direction (first direction D1) of the gate line GL, the branch electrodes 761, 762, 763 and 764 may include a plurality of first branch electrodes 761, a plurality of second branch electrodes 762, plurality of third branch electrodes 763 and a plurality of fourth branch electrodes 764, similar to the pixel electrode 160 of the display device according to the exemplary embodiment illustrated in FIG. 1.

The first branch electrodes 761 include a first pattern portion 761a disposed on the first sub-area S1, a second pattern portion 761b disposed on the second sub-area S2, and a connection portion 761c disposed along an outline between the first sub-area S1 and the second sub-area S2. The connection portion 761c of adjacent first branch electrodes 761 are spaced apart from each other by a predetermined distance.

The second branch electrodes 762 include a first pattern portion 762a disposed on the second sub-area S2, a second pattern portion 762b disposed on the third sub-area S3, and a connection portion 762c disposed along an outline between of the second sub-area S2 and the third sub-area S3. The connection portion 762c of adjacent second branch electrodes 762 are spaced apart from each other by a predetermined distance.

The third branch electrodes 763 include a first pattern portion 763a disposed on the third sub-area S3, a second pattern portion 763b disposed on the fourth sub-area S4, and a connection portion 763c disposed along an outline between the third sub-area S3 and the fourth sub-area S4. The connection portion 763c of adjacent third branch electrodes 763 are spaced apart from each other by a predetermined distance.

The fourth branch electrodes 764 include a first pattern portion 764a disposed on the fourth sub-area S4, a second pattern portion 764b disposed on the first sub-area S1, and a connection portion 764c disposed along an outline between the fourth sub-area S4 and the first sub-area S1. The connection portion 764c of adjacent fourth branch electrodes 764 are spaced apart from each other by a predetermined distance.

A method of manufacturing the display substrate of the exemplary embodiment in FIGS. 9 and 10 is substantially identical to the method of manufacturing the display substrate of the exemplary embodiment in FIG. 1, except for a connection portion of the pixel electrode. Accordingly, the same reference numerals will be used to refer to the same elements as those described, and any detailed explanation will be omitted.

When the pixel electrode is configured according to the illustrated exemplary embodiments, a pixel area PA may be divided into a plurality of domains, and an area where liquid crystal is not controlled may be advantageously minimized.

In exemplary embodiments of the present invention, a display device includes a plurality of branch electrodes in which pixel electrodes are spaced apart from each other, and a connection electrode connecting the branch electrodes, so that a pixel area PA may be divided into a plurality of domains, and conductive patterns connecting a center portion of the branch electrodes may be omitted. Advantageously, the viewing angle of a display device may be improved, and the aperture ratio of a pixel area PA may be improved.

In addition, in a connection portion of a pixel electrode, an angle of a bent portion is smaller than an angle between a first pattern portion and a second pattern portion, or a planarization portion is disposed in a bent portion, so that an area where liquid crystal is not controlled between adjacent domains may be advantageously minimized.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display substrate comprising:
a base substrate comprising a gate line, a data line crossing the gate line and a thin-film transistor electrically connected to the gate line and the data line, the base substrate including a plurality of pixel areas defined thereon; and
a unitary indivisible pixel electrode electrically in one pixel area, connected to the thin film transistor and comprising a plurality of branch electrodes, each of a first and second branch electrode comprising:
a plurality of first pattern portions extended in an inclined direction with respect to the gate line when viewed in a plan view;
a plurality of second pattern portions extended in an inclined direction with respect to the first pattern portions when viewed in the plan view; and
a connection portion between a first end of a first pattern portion and a first end of a second pattern portion, and connecting the first and second pattern portions to each other to form a bent portion,
wherein in the one pixel area, a shape of the first branch electrode is inverted with respect to a shape of the second branch electrode, and the pixel electrode is disconnected between adjacent connection portions within each of the first and second branch electrodes, and
a connection electrode connecting second ends of the first and second patterns to each other, wherein the second ends are opposite to the first ends.

2. The display substrate of claim 1, wherein
a width of the connection electrode is greater than a width of the first pattern portion and a width of the second pattern portion, and
the width of the first pattern portion is substantially equal to the width of the second pattern portion,
the widths taken perpendicular to a longitudinal direction of the connection electrode, the first pattern portion and the second pattern portion, respectively.

3. The display substrate of claim 1, wherein
the pixel area comprises a plurality of sub-areas adjacent to each other,
the first pattern portion and the second pattern portion are respectively disposed in each of adjacent sub-areas, and
the connection portion is disposed along a boundary between the adjacent sub-areas.

4. The display substrate of claim 3, wherein the sub-areas are adjacent to each other along a direction parallel to the gate line, the first pattern portion is inclined at an angle of about −45° with respect to the gate line when viewed in the plan view, and the second pattern portion is inclined at an angle of about −135° with respect to the gate line when viewed in the plan view.

5. The display substrate of claim 3, wherein
the pixel area comprises a first sub-area, a second sub-area adjacent to the first sub-area along an extended direction of the gate line, a third sub-area adjacent to the second sub-area along an extended direction of the data line, and a fourth sub-area adjacent to the first sub-area along the extended direction of the data line and adjacent to the third sub-area along the extended direction of the gate line,
the branch electrodes comprising:
the first branch electrode including a first pattern portion disposed on the first sub-area, a second pattern portion disposed on the second sub-area, and a connection portion disposed along a boundary between the first sub-area and the second sub-area;
the second branch electrode including a first pattern portion disposed on the second sub-area, a second pattern portion disposed on the third sub-area, and a connection portion disposed along a boundary between the second sub-area and the third sub-area;
a third branch electrode including a first pattern portion disposed on the third sub-area, a second pattern portion disposed on the fourth sub-area, and a connection portion disposed along a boundary between the third sub-area and the fourth sub-area; and
a fourth branch electrode including a first pattern portion disposed on the fourth sub-area, a second pattern portion disposed on the first sub-area, and a connection portion disposed along a boundary of the fourth sub-area and the first sub-area.

6. The display substrate of claim 1, wherein
the connection portion comprises a first sub-pattern portion being extended inclined from the first pattern portion, and a second sub-pattern portion being extended inclined from the second pattern portion, the second sub-pattern portion directly contacting the first sub-pattern portion to form the bent portion of the branch electrode, and
an angle between the first sub-pattern portion and the second sub-pattern portion is smaller than or equal to an angle between the first pattern portion and the second pattern portion when viewed in the plan view.

7. The display substrate of claim 6, wherein
the angle between the first pattern portion and the second pattern portion is about 90° when viewed in the plan view, and
the angle between the first sub-pattern portion and the second sub-pattern portion is in a range from about 6° to about 90° when viewed in the plan view.

8. The display substrate of claim 6, wherein the pixel area comprises a plurality of sub-areas adjacent to each other,
each of the first pattern portion and the second pattern portion has a first width in each of the sub-areas, respectively, and
the connection portion is disposed along a boundary of the adjacent sub-areas.

9. The display substrate of claim 8, wherein a width of the connection portion is in a range from one time to ten times the first width.

10. The display substrate of claim 1, wherein the connection portion further comprises a linear portion disposed in an inner edge of the bent portion to increase a width of the bent portion in a direction substantially perpendicular to the linear portion.

11. The display substrate of claim 10, wherein each of the first pattern portion and the second pattern portion has a first width, and first pattern portions and second pattern portions of the branch electrodes adjacent to each other are respectively spaced apart from each other by a second width.

12. The display substrate of claim 11, wherein the width of the bent portion comprising the linear portion is greater than the first width, and is smaller than a total sum of the first width and the second width.

13. The display substrate of claim 1, wherein
the connection portion further comprises:
a first sub-pattern portion being extended from an outer edge of the bent portion, and inclined from the first pattern portion,
a second sub-pattern portion being extended from the outer edge of the bent portion, and inclined from the second pattern portion, the second sub-pattern portion directly contacting the first sub-pattern portion to form the bent portion of the branch electrode, and
a linear portion disposed in an inner edge of the bent portion to increase the width of the bent portion in a direction substantially perpendicular to the linear portion, and
an angle between the first sub-pattern portion and the second sub-pattern portion is smaller than or equal to an angle between the first pattern portion and the second pattern portion when viewed in the plan view.

14. A display device comprising:
a display substrate comprising:
a first base substrate comprising a gate line, a data line crossing the gate line and a thin film transistor electrically connected to the gate line and the data line, the base substrate including a plurality of pixel areas defined thereon; and
a unitary indivisible pixel electrode in one pixel area, electrically connected to the thin film transistor and comprising:
a plurality of branch electrodes, each of a first and a second branch electrode comprising:
a plurality of first pattern portions extended in an inclined direction with respect to the gate line when viewed in a plan view;
a plurality of second pattern portions extended in an inclined direction with respect to the first pattern portions when viewed in the plan view; and
a connection portion between a first end of a first pattern portion and a second end of a second pattern portion, and connecting the first and second pattern portions to each other to form a bent portion,
wherein in the one pixel area, a shape of the first branch electrode is inverted with respect to a shape of the second branch electrode, and the pixel electrode is disconnected between adjacent bent portions within each of the first and second branch electrodes, and
a connection electrode connecting second ends of the first and second patterns to each other, wherein the second ends are opposite to the first ends;
an opposite substrate comprising a second base substrate including a common electrode disposed to face the pixel electrode, the second base substrate facing the first base substrate; and
a liquid crystal layer disposed between the display substrate and the opposite substrate.

15. The display device of claim 14, wherein a width of the connection electrode is greater than a width of the first pattern portion and a width of the second pattern portion, and the width of the first pattern portion being substantially equal to the width of the second pattern portion, and the widths taken perpendicular to a longitudinal direction of the connection electrode, the first pattern portion and the second pattern portion, respectively.

16. The display device of claim 15, wherein the connection portion comprises a first sub-pattern portion being extended inclined from the first pattern portion, and a second sub-pattern portion being extended inclined from the second pattern portion, the second sub-pattern portion directly connected to the first sub-pattern portion to form the bent portion of the branch electrode, and an angle between the first sub-pattern portion and the second sub-pattern portion is smaller than or equal to an angle between the first pattern portion and the second pattern portion when viewed in a plan view.

17. The display device of claim 15, wherein the connection portion further comprises a linear portion disposed in an inner area of the bent portion to increase a width of the bent portion in a direction substantially perpendicular to the linear portion.

18. The display device of claim 15, wherein the connection portion comprises a first sub-pattern portion being extended inclined from the first pattern portion, a second sub-pattern portion being extended inclined from the second pattern portion, the second sub-pattern portion directly connected to the first sub-pattern portion to form the bent portion of the branch electrode, and a linear portion disposed in an inner area of the bent portion to increase a width of the bent portion in a direction substantially perpendicular to the linear portion, and an angle between the first sub-pattern portion and the second sub-pattern portion is smaller than or equal to an angle between the first pattern portion and the second pattern portion when viewed in a plan view.

* * * * *